US009554245B2

(12) United States Patent
Gill et al.

(10) Patent No.: US 9,554,245 B2
(45) Date of Patent: *Jan. 24, 2017

(54) DYNAMIC CONFIGURATION OF MOBILE STATION LOCATION SERVICES

(71) Applicant: TeleCommunication Systems, Inc., Annapolis, MD (US)

(72) Inventors: Regan Gill, Berkeley, CA (US); Ge Xia, Albany, CA (US); Kevin Masao Tsurutome, San Francisco, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/494,774

(22) Filed: Sep. 24, 2014

(65) Prior Publication Data
US 2015/0011245 A1 Jan. 8, 2015

Related U.S. Application Data

(63) Continuation of application No. 12/222,892, filed on Aug. 19, 2008, now Pat. No. 8,862,710.
(Continued)

(51) Int. Cl.
G01S 5/02 (2010.01)
G01S 5/14 (2006.01)
(Continued)

(52) U.S. Cl.
CPC ........... H04W 4/02 (2013.01); H04M 1/72572 (2013.01); G01S 19/11 (2013.01); G01S 19/13 (2013.01); G01S 19/258 (2013.01); G01S 19/48 (2013.01); H04M 2250/10 (2013.01); H04W 64/00 (2013.01); H04W 64/003 (2013.01)

(58) Field of Classification Search
CPC ...... H04L 67/18; H04W 4/02; H04M 1/82572
See application file for complete search history.

(56) References Cited

U.S. PATENT DOCUMENTS 5,359,529 A 10/1994 Snider
5,832,408 A 11/1998 Tamai
(Continued)

FOREIGN PATENT DOCUMENTS

| CA | WO2006/125291 | 5/2005 |
| EP | 1128163 | 8/2001 |
| JP | 2008 039698 | 2/2008 |

OTHER PUBLICATIONS

Ahern et al., "World Explorer: Visualizing Aggregate Data from Unstructured Text in Geo-Referened Collections," Jun. 18-23, 2007, ACM, JCDL'07.
(Continued)

Primary Examiner — Nicholas Taylor
Assistant Examiner — Ho Shiu
(74) Attorney, Agent, or Firm — Tarolli, Sundheim, Covell & Tummino LLP

(57) ABSTRACT

On startup, a mobile station application will determine the current carrier network and submit a query to an application server that will return the correct location server configuration for the specified network. This information will be used on the mobile station to dynamically configure the device through the available GPS chipset API.

12 Claims, 5 Drawing Sheets

Related U.S. Application Data

(60) Provisional application No. 60/960,019, filed on Sep. 11, 2007.

(51) Int. Cl.

| | | |
|---|---|---|
| *H04Q 3/04* | (2006.01) | |
| *H04Q 3/42* | (2006.01) | |
| *H04Q 3/58* | (2006.01) | |
| *H04Q 5/24* | (2006.01) | |
| *H04W 4/02* | (2009.01) | |
| *H04M 1/725* | (2006.01) | |
| *G01S 19/13* | (2010.01) | |
| *G01S 19/11* | (2010.01) | |
| *G01S 19/25* | (2010.01) | |
| *G01S 19/48* | (2010.01) | |
| *H04W 64/00* | (2009.01) | |

(56) References Cited

U.S. PATENT DOCUMENTS

| | | | |
|---|---|---|---|
| 6,064,941 A | 5/2000 | Nimura | |
| 6,119,013 A | 9/2000 | Maloney | |
| 6,185,427 B1 | 2/2001 | Krasner | |
| 6,317,686 B1 | 11/2001 | Ran | |
| 6,377,810 B1* | 4/2002 | Geiger | H04L 63/123 |
| | | | 342/357.4 |
| 6,401,034 B1 | 6/2002 | Kaplan | |
| 6,424,912 B1 | 7/2002 | Correia | |
| 6,434,482 B1 | 8/2002 | Oshida | |
| 6,466,571 B1* | 10/2002 | Dynarski | H04L 61/106 |
| | | | 370/352 |
| 6,470,189 B1 | 10/2002 | Hill et al. | |
| 6,480,783 B1 | 11/2002 | Myr | |
| 6,487,495 B1 | 11/2002 | Gale | |
| 6,507,785 B1 | 1/2003 | Stefan | |
| 6,529,143 B2 | 3/2003 | Mikkola | |
| 6,571,169 B2 | 5/2003 | Miyaki | |
| 6,587,782 B1 | 7/2003 | Nocek | |
| 6,628,938 B1 | 9/2003 | Rachabathuni | |
| 6,636,803 B1 | 10/2003 | Hartz | |
| 6,813,503 B1* | 11/2004 | Zillikens | G08G 1/0962 |
| | | | 455/456.1 |
| 6,820,092 B2 | 11/2004 | Nakano | |
| 6,862,524 B1 | 3/2005 | Nagda | |
| 6,940,407 B2 | 9/2005 | Miranda-Knapp | |
| 6,954,697 B1 | 10/2005 | Smith | |
| 6,963,748 B2 | 11/2005 | Chithambaram | |
| 6,976,253 B1 | 12/2005 | Wierman | |
| 7,054,743 B1 | 5/2006 | Smith | |
| 7,093,286 B1 | 8/2006 | King | |
| 7,155,339 B2 | 12/2006 | Tu | |
| 7,212,829 B1* | 5/2007 | Lau | G06Q 10/00 |
| | | | 340/539.13 |
| 7,373,246 B2 | 5/2008 | O'Clair | |
| 7,379,729 B2 | 5/2008 | Holland | |
| 7,409,219 B2 | 8/2008 | Levitan | |
| 7,480,566 B2 | 1/2009 | Laverty | |
| 7,546,202 B2 | 6/2009 | Oh | |
| 7,565,239 B2 | 7/2009 | De Silva et al. | |
| 7,627,656 B1 | 12/2009 | Anand | |
| 7,706,977 B2 | 4/2010 | Soehren | |
| 7,853,403 B2 | 12/2010 | Tanaka | |
| 7,873,370 B2 | 1/2011 | Shim | |
| 8,095,434 B1 | 1/2012 | Puttick | |
| 8,265,864 B1 | 9/2012 | Kaufman | |
| 8,296,062 B2 | 10/2012 | Yamane | |
| 2001/0021894 A1 | 9/2001 | Sakamoto | |
| 2001/0038626 A1 | 11/2001 | Dynarski | |
| 2001/0047241 A1 | 11/2001 | Khavakh | |
| 2001/0048387 A1 | 12/2001 | Sheynblat | |
| 2001/0055394 A1* | 12/2001 | Vanttinen | H04L 63/0823 |
| | | | 380/258 |
| 2002/0021231 A1 | 2/2002 | Schlager | |
| 2002/0042819 A1 | 4/2002 | Reichert | |
| 2002/0082774 A1 | 6/2002 | Bloebaum | |
| 2002/0098851 A1 | 7/2002 | Walczak | |
| 2002/0147023 A1 | 10/2002 | Sawada | |
| 2002/0171581 A1 | 11/2002 | Sheynblat | |
| 2002/0190861 A1 | 12/2002 | Wentworth | |
| 2003/0033083 A1 | 2/2003 | Nakashima | |
| 2003/0050075 A1 | 3/2003 | Rangarajan | |
| 2003/0055555 A1 | 3/2003 | Knockeart | |
| 2003/0071728 A1 | 4/2003 | McDonald | |
| 2003/0095525 A1 | 5/2003 | Lavin | |
| 2003/0128211 A1 | 7/2003 | Watanabe | |
| 2003/0182052 A1 | 9/2003 | Delorme | |
| 2003/0227911 A1 | 12/2003 | Trossen | |
| 2004/0003125 A1 | 1/2004 | Ichimura | |
| 2004/0023645 A1 | 2/2004 | Olsen | |
| 2004/0027258 A1 | 2/2004 | Pechatnikov | |
| 2004/0067773 A1 | 4/2004 | Rachabathuni | |
| 2004/0105433 A1 | 6/2004 | Seo | |
| 2004/0158829 A1 | 8/2004 | Beresin | |
| 2004/0183724 A1 | 9/2004 | Sheynblat | |
| 2004/0185870 A1 | 9/2004 | Matsuda | |
| 2004/0203603 A1 | 10/2004 | Pierce | |
| 2004/0203873 A1 | 10/2004 | Gray | |
| 2004/0215641 A1 | 10/2004 | Kothuri | |
| 2004/0224702 A1 | 11/2004 | Chaskar | |
| 2004/0225437 A1 | 11/2004 | Endo | |
| 2004/0249568 A1 | 12/2004 | Endo | |
| 2004/0266455 A1 | 12/2004 | Lee | |
| 2005/0037775 A1* | 2/2005 | Moeglein | G01S 5/0036 |
| | | | 455/456.1 |
| 2005/0038876 A1 | 2/2005 | Chaudhuri | |
| 2005/0075119 A1* | 4/2005 | Sheha | G01C 21/26 |
| | | | 455/456.6 |
| 2005/0105496 A1 | 5/2005 | Ambrosino | |
| 2005/0148342 A1 | 7/2005 | Sylvain | |
| 2005/0149253 A1 | 7/2005 | Nambata | |
| 2005/0188333 A1 | 8/2005 | Hunleth | |
| 2005/0215240 A1* | 9/2005 | Urakawa | G06F 17/30867 |
| | | | 455/414.1 |
| 2005/0245249 A1 | 11/2005 | Wierman | |
| 2005/0251331 A1 | 11/2005 | Kreft | |
| 2005/0288033 A1 | 12/2005 | McNew | |
| 2006/0015513 A1 | 1/2006 | Poyhonen | |
| 2006/0023626 A1 | 2/2006 | Krausz | |
| 2006/0034211 A1* | 2/2006 | Kojima | H04L 29/06027 |
| | | | 370/328 |
| 2006/0055693 A1 | 3/2006 | Sylthe | |
| 2006/0064235 A1 | 3/2006 | Ishikawa | |
| 2006/0069503 A1* | 3/2006 | Suomela | H04M 1/72572 |
| | | | 701/431 |
| 2006/0089788 A1 | 4/2006 | Laverty | |
| 2006/0105782 A1 | 5/2006 | Brock | |
| 2006/0135178 A1 | 6/2006 | Allyn | |
| 2006/0155679 A1 | 7/2006 | Kothuri | |
| 2006/0167616 A1 | 7/2006 | Yamane | |
| 2006/0167621 A1 | 7/2006 | Dale | |
| 2006/0173841 A1 | 8/2006 | Bill | |
| 2006/0174209 A1 | 8/2006 | Barros | |
| 2006/0200304 A1 | 9/2006 | Oh | |
| 2006/0200308 A1 | 9/2006 | Arutunian | |
| 2006/0206586 A1 | 9/2006 | Ling | |
| 2006/0223518 A1 | 10/2006 | Haney | |
| 2006/0227047 A1* | 10/2006 | Rosenberg | G01S 5/0054 |
| | | | 342/357.55 |
| 2006/0246922 A1 | 11/2006 | Gasbarro | |
| 2006/0251008 A1 | 11/2006 | Wu | |
| 2006/0253247 A1 | 11/2006 | De Silva et al. | |
| 2006/0264239 A1* | 11/2006 | Tominaga | G06F 17/30194 |
| | | | 455/558 |
| 2007/0010942 A1 | 1/2007 | Bill | |
| 2007/0015518 A1 | 1/2007 | Winter | |
| 2007/0036318 A1 | 2/2007 | Gits | |
| 2007/0055672 A1* | 3/2007 | Stevens | G06F 17/3087 |
| 2007/0072620 A1 | 3/2007 | Levitan | |
| 2007/0083649 A1 | 4/2007 | Zuzga | |
| 2007/0105554 A1 | 5/2007 | Clark | |
| 2007/0118520 A1 | 5/2007 | Bliss | |
| 2007/0153983 A1 | 7/2007 | Bloebaum | |

(56) References Cited

U.S. PATENT DOCUMENTS

| | | |
|---|---|---|
| 2007/0155401 A1 | 7/2007 | Ward |
| 2007/0156334 A1 | 7/2007 | Vu |
| 2007/0162942 A1 | 7/2007 | Hamynen |
| 2007/0185985 A1 | 8/2007 | Shim |
| 2007/0213043 A1 | 9/2007 | Son |
| 2007/0219706 A1 | 9/2007 | Sheynblat |
| 2007/0219708 A1 | 9/2007 | Brasche |
| 2007/0238472 A1* | 10/2007 | Wanless ............ H04L 29/06027 455/461 |
| 2007/0253642 A1 | 11/2007 | Berrill |
| 2007/0281717 A1 | 12/2007 | Bharadwaj |
| 2007/0288613 A1 | 12/2007 | Sudame |
| 2007/0298812 A1* | 12/2007 | Singh ............... H04L 29/12122 455/456.1 |
| 2008/0071465 A1 | 3/2008 | Chapman |
| 2008/0082262 A1 | 4/2008 | Silva et al. |
| 2008/0111737 A1* | 5/2008 | Haverkamp ............ G01S 19/25 342/357.64 |
| 2008/0112372 A1 | 5/2008 | Thomson |
| 2008/0112551 A1 | 5/2008 | Forbes |
| 2008/0113671 A1 | 5/2008 | Ghozati |
| 2008/0130597 A1 | 6/2008 | Kalhan |
| 2008/0139114 A1 | 6/2008 | Ranganathan |
| 2008/0140307 A1 | 6/2008 | Chen |
| 2008/0146207 A1 | 6/2008 | Razdan |
| 2008/0153550 A1 | 6/2008 | Otaka |
| 2008/0171559 A1 | 7/2008 | Frank |
| 2008/0177462 A1 | 7/2008 | Yoshioka |
| 2008/0177839 A1 | 7/2008 | Chang |
| 2008/0180320 A1* | 7/2008 | Tysowski ............. G01S 19/258 342/357.43 |
| 2008/0218407 A1 | 9/2008 | Norda |
| 2008/0227463 A1* | 9/2008 | Hizume ................ H04W 64/00 455/456.1 |
| 2008/0249983 A1 | 10/2008 | Meisels |
| 2008/0261560 A1 | 10/2008 | Ruckert |
| 2008/0268822 A1 | 10/2008 | Johnson |
| 2008/0270366 A1 | 10/2008 | Frank |
| 2008/0275637 A1 | 11/2008 | Kim |
| 2008/0280599 A1 | 11/2008 | Cheng |
| 2008/0280600 A1* | 11/2008 | Zhou .................. G06F 17/3087 455/415 |
| 2008/0307445 A1 | 12/2008 | Garg |
| 2008/0319652 A1 | 12/2008 | Moshfeghi |
| 2008/0319653 A1 | 12/2008 | Moshfeghi |
| 2009/0009397 A1 | 1/2009 | Taylor |
| 2009/0029693 A1 | 1/2009 | Liwell |
| 2009/0055087 A1 | 2/2009 | Beacher |
| 2009/0061852 A1 | 3/2009 | Feher |
| 2009/0061862 A1 | 3/2009 | Alberth |
| 2009/0070445 A1* | 3/2009 | Gill ................... H04M 1/72572 709/222 |
| 2009/0100037 A1 | 4/2009 | Scheibe |
| 2009/0144247 A1 | 6/2009 | Wistrand et al. |
| 2009/0192702 A1 | 7/2009 | Bourne |
| 2009/0237307 A1 | 9/2009 | Tsai |
| 2009/0298505 A1 | 12/2009 | Drane |
| 2009/0325615 A1 | 12/2009 | Mckay |
| 2010/0037057 A1 | 2/2010 | Shim et al. |
| 2010/0094550 A1 | 4/2010 | Tsurutome et al. |
| 2010/0113072 A1 | 5/2010 | Gibson |
| 2010/0214117 A1 | 8/2010 | Hazzani |
| 2010/0232405 A1* | 9/2010 | Kikuchi ................ H04W 4/001 370/338 |
| 2010/0285817 A1* | 11/2010 | Zhao ...................... H04W 4/02 455/456.3 |
| 2011/0003578 A1 | 1/2011 | Chen et al. |
| 2011/0035141 A1 | 2/2011 | Barker |

OTHER PUBLICATIONS

International Search Report in PCT/US2008/10543 dated Aug. 19, 2010.
International Search Report in PCT/US2008/10542 dated Aug. 19, 2010.
Internal Search Report received in PCT/US2008/10542 dated Nov. 26, 2008.
Internal Search Report received in PCT/US2008/10543 dated Dec. 11, 2008.
International Search Report in PCT/US2009/05486 dated Jan. 21, 2010.
Internal Search Report received in PCT/US2008/12621 dated Jan. 8, 2009.
Internal Search Report received in PCT/US2009/02016 dated May 27, 2009.
European Search Report received in European Appl. No. 09819547.2 dated Oct. 16, 2012.
European Search Report received in European Appl. No. 09819546.4 dated Oct. 15, 2012.
John Krumm et al, "Map Matching with Travel Time Constraints", SAE 2007 World Congress, Apr. 19, 2007.
Smith, Don; How to: Use the Nokia N95 GPS/A-GPS, Aug. 16, 2007, http://www.simplysymbian.com/2007/08/16/how-to-use-the-nokia-n95-gpsa-gps.
Guim, Mark; GPS Lock Taking Too Long? Try Google Location Server supl.google.com, Dec. 16, 2009, http:thenokiablog.com/2009/12/16/google-location-server-supl/.

* cited by examiner

DYNAMIC CONFIGURATION OF MOBILE STATION LOCATION SERVICES

The present application is a continuation of U.S. patent application Ser. No. 12/222,892, entitled "Dynamic Configuration of Mobile Station Location Services", filed on Aug. 19, 2008; which claims priority from U.S. Provisional Application 60/960,019, entitled "DYANMIC CONFIGURTION OF MOBILE STATION LOCATION SERVICES" to Gill et al., filed Sep. 11, 2007, the entirety of both of which are expressly incorporated herein by reference.

BACKGROUND OF THE INVENTION

1. Field of the Invention

This invention relates generally to location based wireless services, and more specifically, to location enabled applications for wireless mobile devices.

2. Background of Related Art

Most mobile station (cell phone) GPS implementations depend on network access to a 'location server' for base station almanac (BSA) data and/or computational support. The IP address, port and type of connection must be known to the mobile station in order for the mobile station software and GPS chipset to communicate with this location server. Many Tier 1 carriers pre-configure their devices with this information.

Most location based applications rely on the device being pre-configured by the carrier with the correct location server configuration information. If this configuration is incorrect or does not exist, location services are not available.

The location configuration is static and must be established in advance by the wireless carrier. Existing GPS capable phones cannot be reconfigured (except manually) to access a new location server. When TCS sells its location platform into a new carrier, it is not possible to turn on location services on devices that are already deployed.

SUMMARY OF THE INVENTION

In accordance with the principles of the invention, a method and apparatus for configuring a mobile device comprises transmitting a request for location configuration data. The location configuration data is received in response to the request for location configuration data. Navigation hardware is initialized with the location configuration data.

In accordance with the principles of the invention, a system for configuring a mobile device comprises a mobile device to transmit a request for location configuration data, a location configuration data server to receive the request for location configuration data and to formulate a database query, and a database to store the location configuration data. A wireless network communicates the request for location configuration data and the location configuration data between the mobile device and the location configuration server.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

This invention addresses two problems related to management of the location server configuration data on the mobile station. First, many Tier 2 carriers are not able, for business and/or technical reasons, to pre-configure their devices with the required information. This places the burden of configuration on the application provider. Second, location services should be available even when the mobile station is roaming on a partner network that maintains its own location server and proprietary BSA data.

Both of these problems are resolved by a mechanism that dynamically establishes the location server configuration based on the current carrier network.

In accordance with the principles of the present invention, on startup, the mobile station application will determine the current carrier network and submit a query to an application server that will return the correct location server configuration for the specified network. This information will be used on the mobile station to dynamically configure the device through the available GPS chipset API.

Very importantly, this invention disclosed herein allows applications to run on devices that have not been pre-configured with a location server configuration. In addition, applications using this invention are able to provide location services outside of the primary network as long as alternate location servers for the current network are available.

The present invention has particularly application for developers of location enabled wireless applications.

Figure 1:
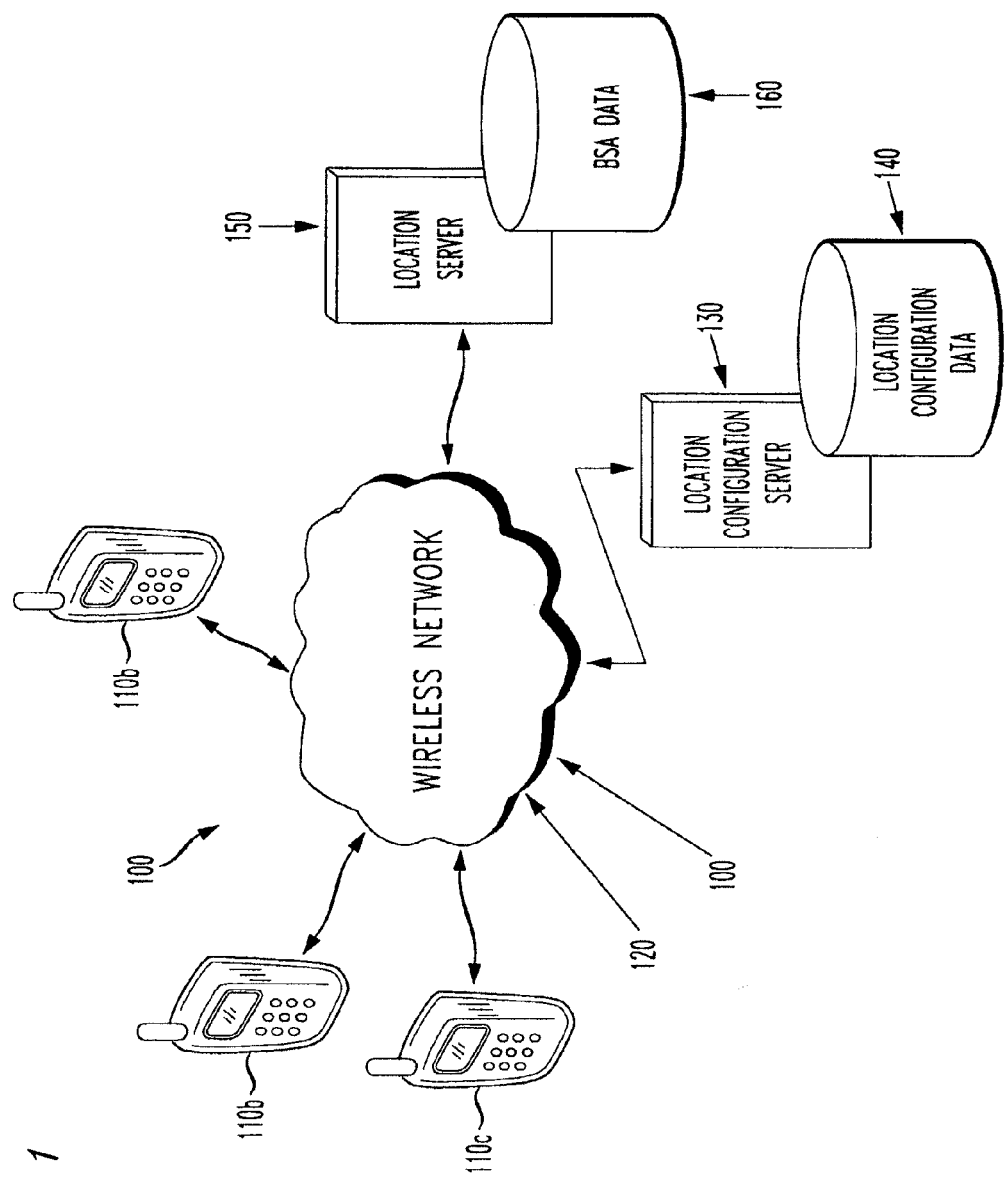
FIG. 1 shows a system for transmitting a request for and receiving location configuration data, in accordance with the principles of the present invention.

FIG. 1 shows a system for transmitting a request for and receiving location configuration data, in accordance with the principles of the present invention.

In particular, as shown in FIG. 1, a system 100 for transmitting a request for and receiving location configuration data can include various wireless devices 110a, 110b, and 110c, a wireless network 120, a location configuration server 130, and a location configuration database 140.

Instead of manually entering location configuration data into any of wireless devices 110a, 110b, and 110c or being pre-configured with location configuration data, in accordance with the principles of the present invention a request for location configuration data is transmitted by any of wireless devices 110a, 110b, and 110c. The transmitted request for location configuration data is packaged into one or more data packets for transmission over the wireless network 120 to location configuration server 130, as is known within the art.

The various wireless devices 110a, 110b, and 110c can include any class of device such as, cellular telephones, personal data assistants (PDAs), laptop computers, etc., that contain navigation hardware that require location configuration data for access to a location server. As discussed above, such a location server 150 can provide base station almanac (BSA) data 160 and/or computational support.

The various wireless devices 110a, 110b, and 110c must be properly configured with an IP address, port and type of connection to the mobile station. Proper configuration allows for mobile station software used by the various wireless devices 110a, 110b, and 110c and navigation hardware, such as a GPS chipset, to communicate with the location server 150.

A client application operating on the various wireless devices 110a, 110b, and 110c may receive multiple configurations in a single response. These configurations may be labeled as 'Test' or "Production" location servers or may provide secondary server configuration data to be used if the primary server is not available.

Wireless network 120 allows the various wireless devices 110a, 110b, and 110c to communicate with a location configuration server 130. Any wireless network can be employed that allows data communications for transmitting a request for and receiving location configuration data between the various wireless devices 110a, 110b, and 110c and a location configuration server 130.

Location configuration server 130 receives requests for location configuration data from wireless network 120. A database query is formulated by the location configuration server 130 from parameters associated with the received request for location configuration data. Such parameters can include a carrier network identification and at least one application identification. The database query is submitted by the location configuration server 130 to the location configuration database 140 to search the content of location configuration database 140 for entries that match the received parameters, as is known within the art.

The location configuration database 140 can be managed by any number of database programs, such as, Oracle, Sybase, mySQL, Lotus Approach, Microsoft Access, Filemaker, etc. Any database program that allows for the retrieval of location configuration data from parameters can be used with the invention; parameters such as carrier network identification and at least one application identification.

Location configuration server 130 and location configuration database 140 are described herein for simplicity as being separate components. However, location configuration database 140 can exist within the location configuration server 130. In such an instance, the description above of location configuration server 130 submitting a database query to the location configuration database 140 would remain the same.

Figure 2:
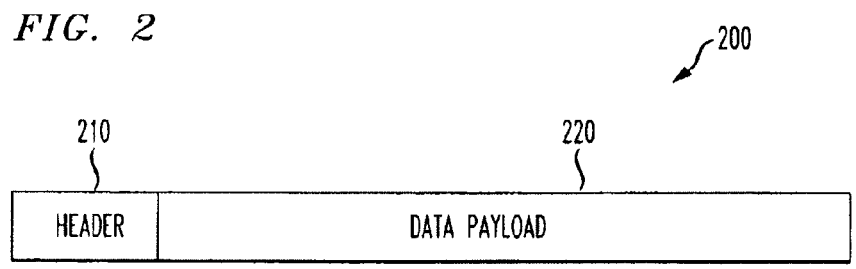
FIG. 2 shows an exemplary data packet for submitting a request for location configuration data, in accordance with the principles of the present invention.

FIG. 2 shows an exemplary data packet for submitting a request for location configuration data, in accordance with the principles of the present invention.

In particular, as shown in FIG. 2, a data packet for submitting a request for location configuration data 200 can include a header portion 210 and a data payload portion 220.

Header potion 210 can include source and destination addresses, error-checking fields, etc., as is well known within the art.

Data payload portion 220 can include carrier network identification data and at least one application identification that are both associated with a various wireless devices 110a, 110b, and 110c transmitting a request for location configuration data.

Depending upon the wireless network employed and network traffic therein, the data packet for submitting a request for location configuration data 200 may be fragmented into a plurality of data packets. The plurality of data packets are then reassembled at the receiving end, as is known within the art.

Figure 3:
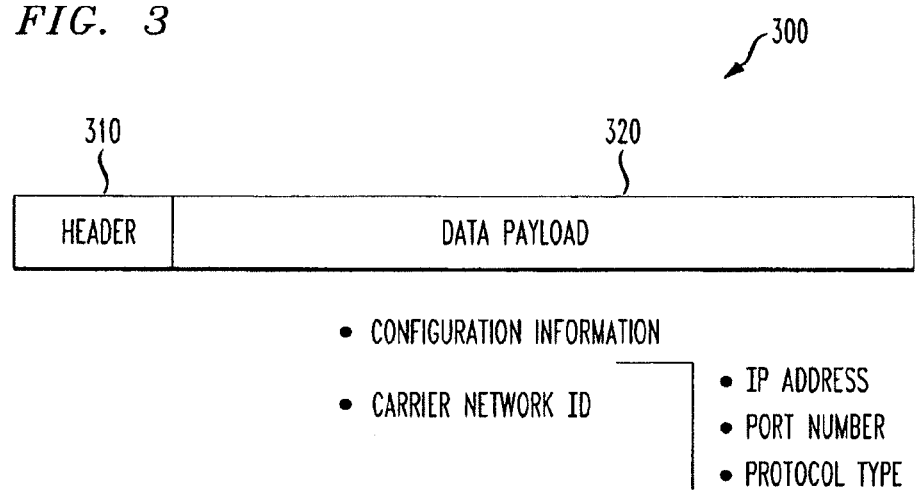
FIG. 3 shows an exemplary data packet for transmitting location configuration data, in accordance with the principles of the present invention.

FIG. 3 shows an exemplary data packet for transmitting location configuration data, in accordance with the principles of the present invention.

In particular, as shown in FIG. 3, a data packet for transmitted location configuration data 300 can include a header portion 310 and a data payload portion 320.

Header potion 310 can include source and destination addresses, error-checking fields, etc., as is well known within the art.

Data payload portion 320 can include configuration information and carrier network identification. The configuration information can include an Internet Protocol (IP) address, a port number, and a protocol type. A plurality of configuration data can be returned in response to a single request for location configuration data, respectively corresponding to application identification supplied in the request for location configuration data 200.

Depending upon the wireless network employed and network traffic therein, the data packet for transmitted location configuration data 300 may be fragmented into a plurality of data packets. The plurality of data packets are then reassembled at the receiving end, as is known within the art.

Figure 4:
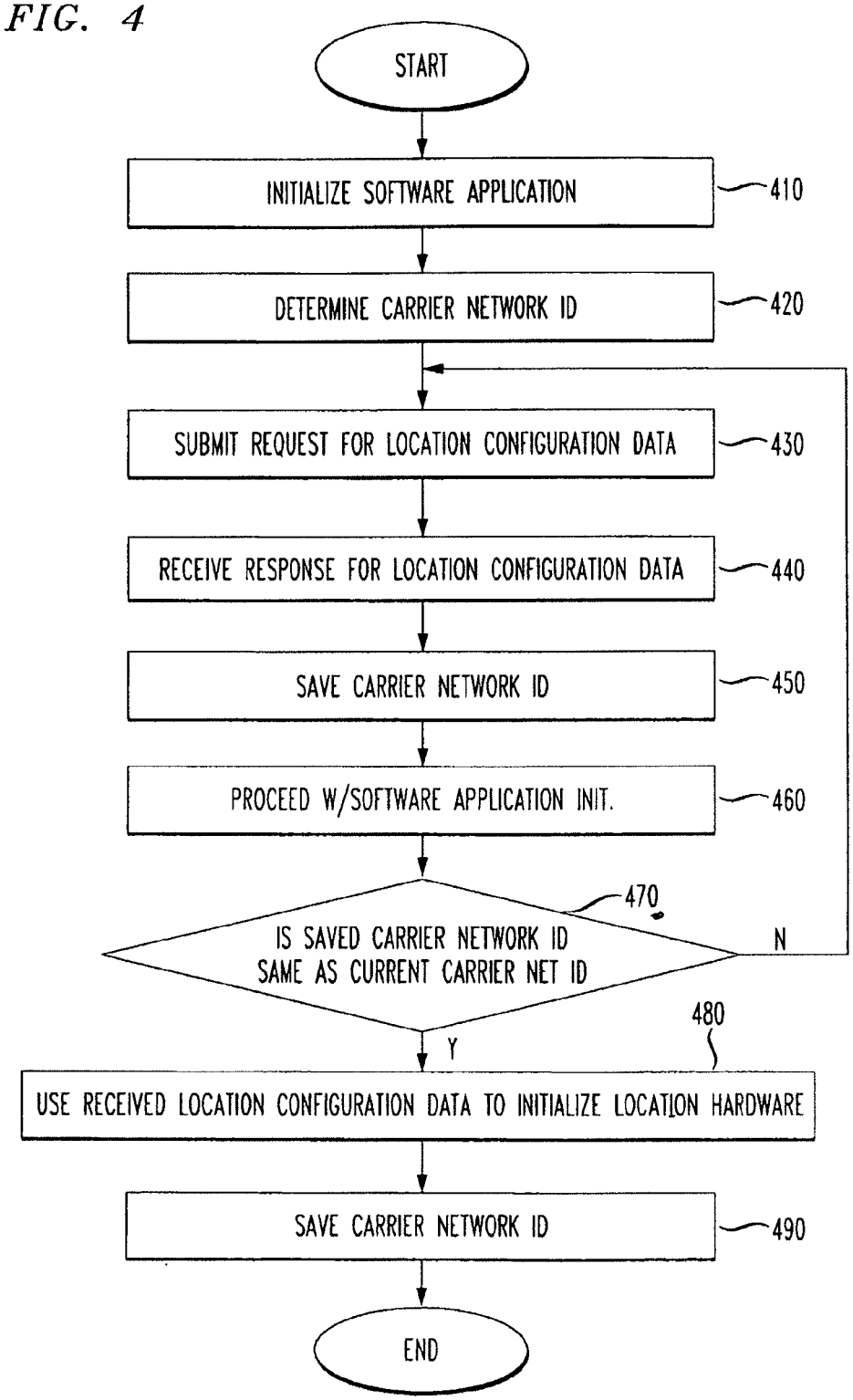
FIG. 4 shows an exemplary method of submitting a request for location configuration information, in accordance with the principles of the present invention.

FIG. 4 shows an exemplary method of submitting a request for location configuration information, in accordance with the principles of the present invention.

In particular, a method of submitting a request for location configuration information 400 begins with step 410, of FIG. 4, in which a software application at any of wireless devices 110a, 110b, and 110c is initialized.

In step 420, software within any of wireless devices 110a, 110b, and 110c determines the current carrier network identification associated with any of wireless devices 110a, 110b, and 110c. As is known within the art, carrier network identifications can often change as any of wireless devices 110a, 110b, and 110c roam.

In step 430, a request for location configuration data is formulated at any of wireless devices 110a, 110b, and 110c. The request for location configuration data is submitted to the location configuration server 130 using the exemplary data packet for submitting a request for location configuration data 200, shown in FIG. 2.

A response to the request for location configuration data submitted to the location configuration server 130 is received in step 440. The response to the request for location configuration data is received from the location configuration server 130 using the exemplary data packet for transmitting location configuration data 300, shown in FIG. 3.

In step 450, the carrier network identification received in step 440 is saved within memory in any of wireless devices 110a, 110b, and 110c.

In step 460, the initialization of software application that began in step 410 proceeds.

A determination is made if the current carrier network identification is the same as the carrier network identification saved in step 450, in step 470. As discussed above, a carrier network identification could possible change at some time between steps 420 and 450 because of a roaming condition. If the determination in step 470 is that the current carrier network identification is not the same as the carrier network identification saved in step 450, the method of submitting a request for location configuration information 400 branches to step 420. If the determination in step 470 is that the current carrier network identification isare the same as the carrier network identification saved in step 450, the method of submitting a request for location configuration information 400 branches to step 480.

In step 480, the location configuration data received in step 440 is used to initialize/re-initialize navigation hardware associated with any of wireless devices 110a, 110b, and 110c, such as a GPS chipset.

The carrier network identification is saved in step 490. Any of wireless devices 110a, 110b, and 110c submitting a request for location configuration data are then configured. The method of submitting a request for location configuration information 400 ends.

Figure 5:
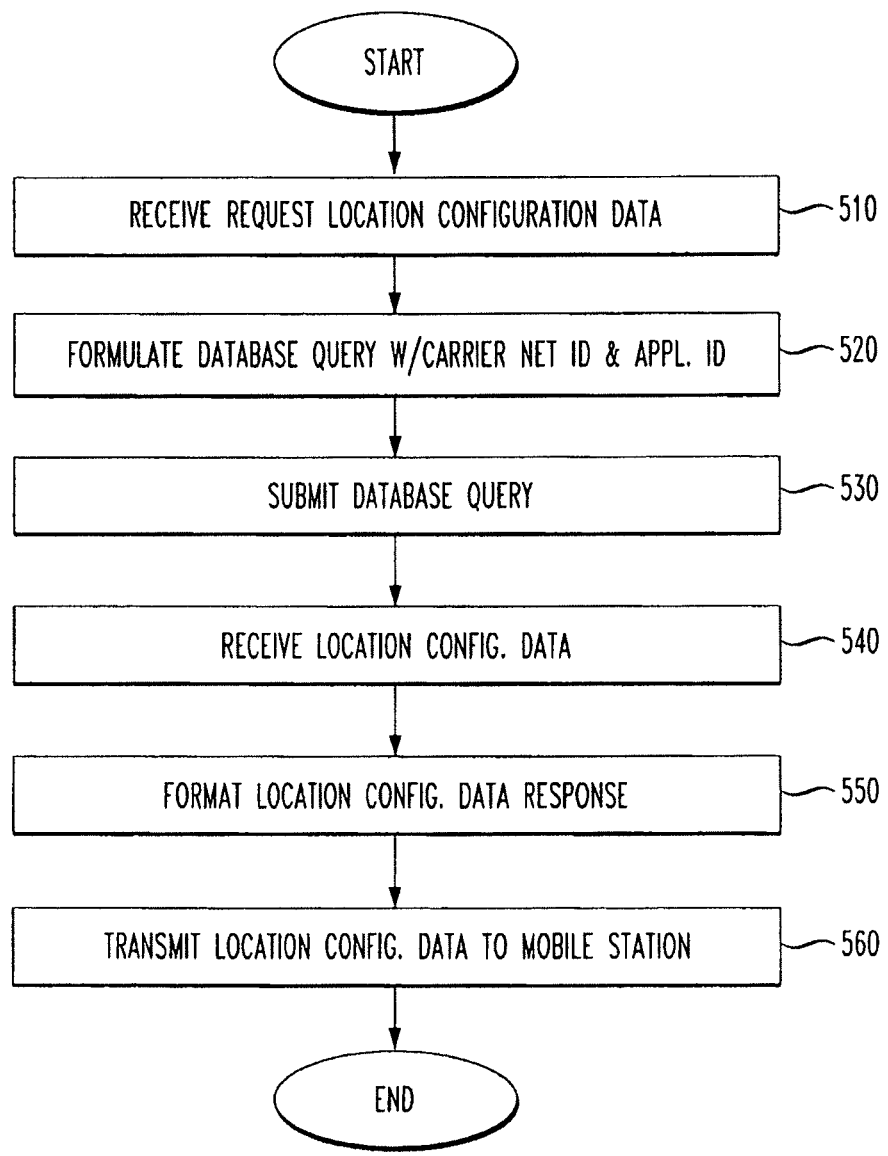
FIG. 5 shows an exemplary method of responding to a request for location configuration information, in accordance with the principles of the present invention.

FIG. 5 shows an exemplary method of responding to a request for location configuration information, in accordance with the principles of the present invention.

In particular, a method of responding to a request for location configuration information 500 begins with step 510, of FIG. 5, in which a request for location configuration data is received by a location configuration server 130. The request for location configuration data is submitted to the location configuration server 130 using the exemplary data packet for submitting a request for location configuration data 200, shown in FIG. 2.

In step 520, a database query is formulated by the location configuration server 130 with the parameters supplied in the data packet for submitting a request for location configuration data 200.

In step 530, the database query formulated in step 520 is submitted to location configuration database 140.

In response to the submission of the database query in step 530, in step 540 at least one set of location configuration data is received by the location configuration server 130 from the location configuration database 140.

In step 550, the location configuration data received in step 530 is formatted into the exemplary data packet for transmitting location configuration data 300, shown in FIG. 3.

In step 560, the exemplary data packet for transmitting location configuration data 300, shown in FIG. 3, is transmitted from location configuration server 130 to any of wireless devices 110a, 110b, and 110c. The method of responding to a request for location configuration information 500 then ends.

The methods disclosed in FIGS. 4 and 5 can be implemented in software, in hardware or a combination of hardware and software. Hardware implementation can include use of one or more of a Application-Specific Integrated Circuit (ASIC), Programmable Logic Array (PAL), Electrically Erasable Programmable Read Only Memory(EEPROM), Read Only Memory (ROM), Field Programmable Gate Array (FPGA), etc. Software implementation can include use of long term storage, short term storage, a processing unit, etc. associated with a wireless device.

While the invention has been described with reference to the exemplary embodiments thereof, those skilled in the art will be able to make various modifications to the described embodiments of the invention without departing from the true spirit and scope of the invention.

What is claimed is:

1. A method of dynamically establishing location server configuration on a wireless phone based on a current carrier network, comprising:
   determining, on a physical wireless phone, a current carrier network providing service to said wireless phone;
   routing, initiated by said wireless phone to an application server, a first configuration request for location server access configuration data to enable access to a physical location server in said current carrier network, said location server access configuration data including a carrier network identification;
   receiving, in response to said configuration request, said location server access configuration data for said physical location server in said current carrier network;
   routing a second configuration request for location server access configuration data when said current network identification does not match said current carrier network; and
   initializing navigation hardware on said physical wireless phone with said received location server access configuration data, and dynamically configuring said physical wireless phone with said received location server configuration data, when said carrier network identification matches said current carrier network.

2. The method of dynamically establishing location server configuration on a wireless phone based on a current carrier network according to claim 1, wherein:
   said wireless phone is dynamically configured through a GPS chipset API.

3. The method of dynamically establishing location server configuration on a wireless phone based on a current carrier network according to claim 1, wherein:
   said current carrier network is determined during startup of said mobile device.

4. The method of dynamically establishing location server configuration on a wireless phone based on a current carrier network according to claim 1, wherein:
   said current carrier network is a roamed carrier network.

5. The method of dynamically establishing location server configuration on a wireless phone based on a current carrier network according to claim 1, wherein:
   said configuration request for location access configuration data includes both said carrier network identification and said application identification.

6. The method of dynamically establishing location server configuration on a wireless phone based on a current carrier network according to claim 1, wherein said access configuration data comprises:
   an Internet Protocol (IP) address;
   a port number; and
   a protocol type.

7. Apparatus for dynamically establishing location server configuration on a wireless phone based on a current carrier network, comprising:
   means for determining, on a physical wireless phone, a current carrier network providing service to said wireless phone;
   means for routing, initiated by said wireless phone to an application server, a first configuration request for location server access configuration data to enable access to a physical location server in said current carrier network, said location server access configuration data including a carrier network identification;
   means for receiving, in response to said configuration request, said location server access configuration data for said physical location server in said current carrier network;
   means for routing a second configuration request for location server access configuration data when said current network identification does not match said current carrier network; and
   means for initializing navigation hardware on said physical wireless phone with said received location server access configuration data, and for dynamically configuring said physical wireless phone with said received location server configuration data, when said carrier network identification matches said current carrier network.

8. The apparatus for dynamically establishing location server configuration on a wireless phone based on a current carrier network according to claim 7, wherein:
said wireless phone is dynamically configured through a GPS chipset API.

9. The apparatus for dynamically establishing location server configuration on a wireless phone based on a current carrier network according to claim 7, wherein:
said current carrier network is determined during startup of said mobile device.

10. The apparatus for dynamically establishing location server configuration on a wireless phone based on a current carrier network according to claim 7, wherein:
said current carrier network is a roamed carrier network.

11. The apparatus for dynamically establishing location server configuration on a wireless phone based on a current carrier network according to claim 7, wherein:
said configuration request for location access configuration data includes both said carrier network identification and said application identification.

12. The apparatus for dynamically establishing location server configuration on a wireless phone based on a current carrier network according to claim 7, wherein said access configuration data comprises:
an Internet Protocol (IP) address;
a port number; and
a protocol type.

* * * * *